United States Patent [19]
Carter, Jr.

[11] Patent Number: 5,461,821
[45] Date of Patent: Oct. 31, 1995

[54] BREAKAWAY FISHING SINKER

[76] Inventor: Leonard R. Carter, Jr., 1021 Anzio St., Crescent City, Calif. 95531

[21] Appl. No.: 323,616

[22] Filed: Oct. 17, 1994

[51] Int. Cl.⁶ .................................................. A01K 95/00
[52] U.S. Cl. ............................................................ 43/43.12
[58] Field of Search .............................. 43/43.12, 43.14, 43/44.97

[56] References Cited

U.S. PATENT DOCUMENTS

| | | | |
|---|---|---|---|
| 2,841,911 | 4/1956 | Dahlgren | 43/43.12 |
| 3,030,726 | 5/1959 | Knapton | 43/44.93 |
| 3,648,398 | 3/1972 | Newell | 43/43.12 |
| 3,670,447 | 6/1972 | Wohead | 43/44.97 |
| 3,744,177 | 7/1973 | Cron | 43/43.12 |
| 3,925,921 | 12/1975 | Tucker | 43/43.12 |
| 3,991,505 | 11/1976 | Simeti | 43/43.12 |
| 4,679,349 | 7/1987 | Birchfield | 43/44.97 |
| 4,753,030 | 6/1988 | Ziglinski | 43/43.12 |
| 4,837,968 | 6/1989 | Lin | 43/43.12 |
| 4,926,580 | 5/1990 | Lin | 43/43.12 |
| 5,054,227 | 10/1991 | Lin | 43/43.12 |
| 5,243,779 | 9/1993 | Reed | 43/43.12 |
| 5,375,365 | 12/1994 | Brouder | 43/43.12 |

*Primary Examiner*—Kurt Rowan
*Attorney, Agent, or Firm*—James D. Givnan, Jr.

[57] ABSTRACT

A fishing sinker having a length of rubber tubing attachable to a fishing line with a wire snap. A wire segment of the snap is insertably engaged with one end of the rubber tubing and tears free of the tubing, upon the sinker becoming snagged on an obstruction, to allow retrieval of the remainder of the rigging. Lead weights of different sizes are selectively inserted into the tubing.

4 Claims, 1 Drawing Sheet

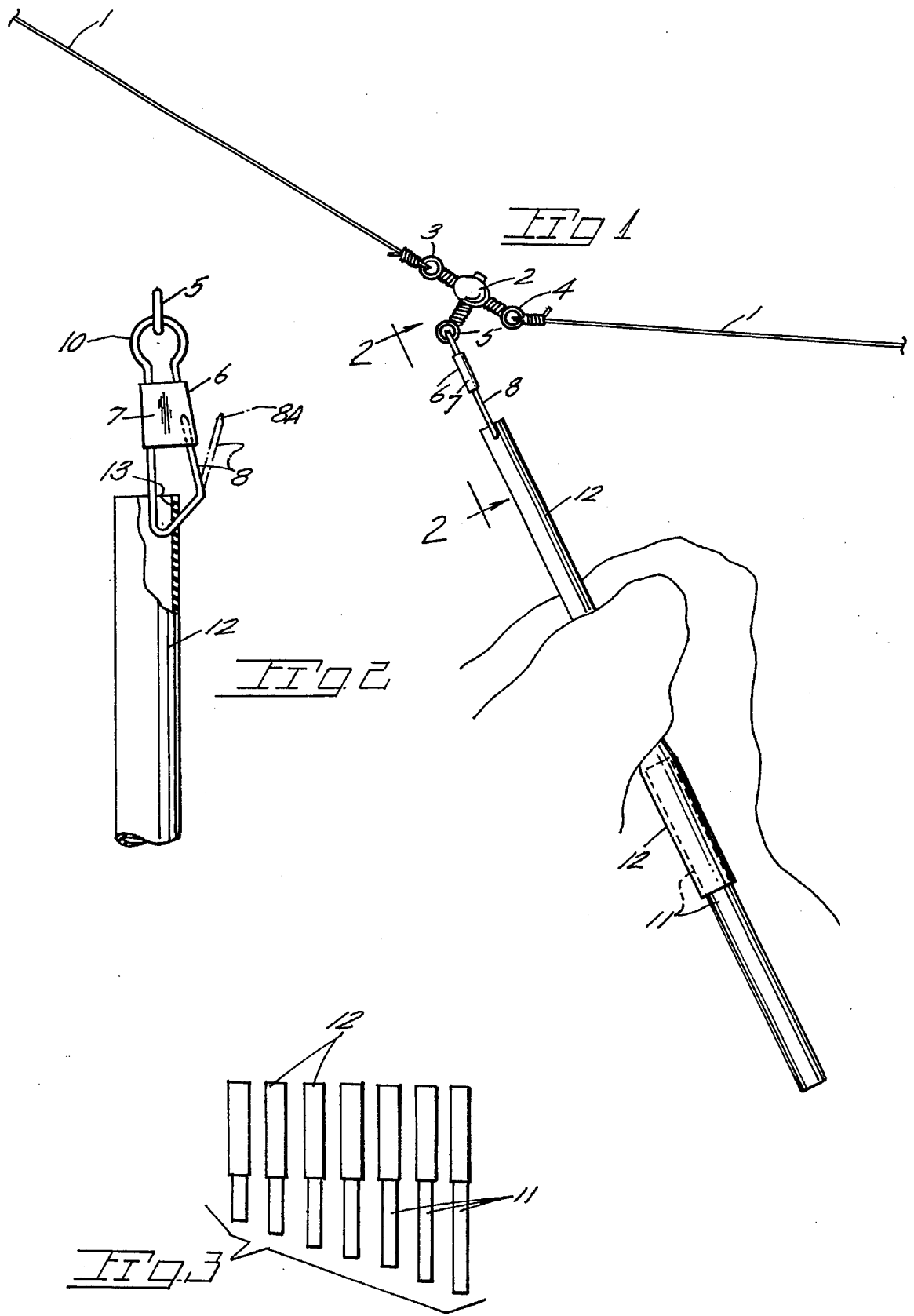

BREAKAWAY FISHING SINKER

BACKGROUND OF THE INVENTION

The present invention pertains generally to fishing gear and particularly the rigging of a sinker to a fishing line.

As fishing line sinkers are subject to hanging up on underwater obstructions it is not uncommon to lose costly fishing gear when the line breaks during the attempt to pull the sinker free. The bulky shape of some weights or sinkers renders them susceptible to snagging on obstructions. Typically the lure or bait, being located rearwardly of the sinker, is lost when the line breaks during a recovery effort. Further, some sinker designs include shaped wire components for line or leader attachment which contribute to sinker cost and limit, from a cost standpoint, the range of sinker weights used by a fisherman.

U.S. Pat. No. 3,647,398 discloses a releasable sinker assembly which utilizes a cylindrical sinker having one end inserted, for a portion of its length, into a holder of tubular construction with a remaining holder portion having an eye formed therein to receive a fishing line. Upon the sinker becoming snagged on an underwater obstruction, the application of a force on the holder by the fishing line will cause expulsion of the sinker to allow subsequent retrieval of the holder. Rupture of the holder eye by fishing line imparted forces occurs in instances where the sinker assembly is permanently snagged. The holder is of resilient material.

U.S. Pat. No. 2,841,911 shows the general combination of a sinker with a cylindrical post to which the lower end of a length of resilient tubing is attached. In the event of the sinker becoming snagged, the tubing may be pulled free of the sinker. The tubing and a three-way swivel are not intended to separate upon snagging of the sinker.

SUMMARY OF THE PRESENT INVENTION

The present invention is embodied in a low cost sinker attachable to a fishing line in a manner to ensure release of a snagged sinker without loss of relatively costly other rigging components.

An elongate sinker is carried by an elastomeric member having a snap coupled to one end. The snap is suitably connected to the fishing line. Pulling on the line, during efforts to dislodge a snagged sinker, will cause the snap to tear away from the elastomeric member with the lost gear limited to the inexpensive member and sinker.

Important objectives of the present invention include the provision of a sinker for a fishing line which, upon becoming snagged on an underwater obstruction, permits separation of the sinker from the line to allow retrieval of the remaining portion of the rigging; the provision of a sinker which permits ready substitution of sinkers of various weights without time consuming re-rigging of the fishing line; the provision of a sinker of extremely low cost of manufacture permitting the fisherman to carry a wide array of sinkers of different weights; the provision of a sinker including a snap attachment which pulls free from an elastomeric sinker component to permit retrieval of the remainder of the rigging which may include costly lures.

BRIEF DESCRIPTION OF THE DRAWINGS

With attention to the accompanying drawings:

FIG. 1 is a side elevational view of a segment of fishing line with the present sinker attached;

FIG. 2 is an elevational view taken along line 2—2 of FIG. 1; and

FIG. 3 is an elevational view of a series of sinkers of different weights.

DETAILED DESCRIPTION OF THE PREFERRED EMBODIMENTS

With continuing attention to the drawings wherein applied reference numerals indicate parts similarly hereinafter identified, the reference numeral 1 indicates a fishing line with a right hand segment terminating at a lure (not shown) or other rigging components.

The present attachment means includes a connector 2 which may be a three-way swivel having eyes at 3 and 4 attached to segments I of the fishing line. An additional eye 5 projects laterally from the connector to receive a snap 6.

Snap 6 may be formed from steel wire having a retainer 7 which serves to confine a positionable wire end segment 8 which terminates at an end 8A. End 8A is inherently biased toward the broken line position of FIG. 2 and upon fingertip pressure being applied is positionable into hooked engagement with retainer 7 which includes a reversed edge (not shown). The snap includes an eye 10 for installation in swivel eye 5.

Sinker 11 is of the pencil type, i.e., of elongate cylindrical shape to permit partial lengthwise insertion into a tube 12 of elastomeric material. During assembly of the sinker, the end 8A of snap wire 8 is released from retainer 7 and passed or inserted through the tubing wall adjacent the unoccupied tubing end. To facilitate such insertion the wire end 8A may be pointed.

The tubing 12, being of elastomeric nature, permits the wire 8 to separate from the tubing by tearing of the latter as indicated at 13. Subsequent to tearing, the balance of the rigging attached to the right hand segment 1 of the fishing line may be retrieved. Pencil lead 11 and tubing 12 are very low cost items. In view of the modest cost of pencil leads and tubing a wide array of sinker and tubing combinations may be carried by the fisherman to permit optimum selection of the sinker weights.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

1. A fishing sinker comprising, a connector for attachment to a fishing line, a snap having an eye in engagement with said connector and a flexible wire component, a tubular member of elastomeric material and having a first end and a second end, an elongate sinker in inserted engagement with said second end of the tubular member, said wire component in pierced engagement with said first end of the tubular member, and snagging of the sinker on an obstruction permitting retrieval of the fishing line upon tearing of the elastomeric tubing member by the wire component.

2. The sinker claimed in claim 1 wherein said connector is a three-way swivel.

3. The sinker claimed in claim 1 wherein said tubular member is a length of rubber tubing.

4. The sinker claimed in claim 1 wherein said elongate sinker is retained in said tubular member by frictional engagement with an inner wall surface of the tubular member.

* * * * *